(12) United States Patent
Meng (10) Patent No.: US 11,500,267 B2
(45) Date of Patent: Nov. 15, 2022

(54) VARIABLE DIAPHRAGM AND CONTROL METHOD THEREOF

(71) Applicant: BOE TECHNOLOGY GROUP CO., LTD., Beijing (CN)

(72) Inventor: Xianqin Meng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/255,516

(22) PCT Filed: Apr. 17, 2020

(86) PCT No.: PCT/CN2020/085228
§ 371 (c)(1),
(2) Date: Dec. 23, 2020

(87) PCT Pub. No.: WO2020/211825
PCT Pub. Date: Oct. 22, 2020

(65) Prior Publication Data
US 2021/0278747 A1 Sep. 9, 2021

(30) Foreign Application Priority Data
Apr. 19, 2019 (CN) .......................... 201910318491.7

(51) Int. Cl.
*G03B 9/02* (2021.01)
*G01L 9/00* (2006.01)
*H04N 5/238* (2006.01)

(52) U.S. Cl.
CPC .............. *G03B 9/02* (2013.01); *G01L 9/0016* (2013.01); *H04N 5/238* (2013.01)

(58) Field of Classification Search
CPC .......... G03B 9/02; G02B 5/005; G02B 26/05; G02B 2207/115; H04N 5/238
See application file for complete search history.

(56) References Cited

U.S. PATENT DOCUMENTS 10,262,601 B1 * 4/2019 Guntaka ................. G09G 3/348
10,379,339 B1 * 8/2019 Rainaut .................. G02B 5/201
(Continued)

FOREIGN PATENT DOCUMENTS

| CN | 101030011 A | 9/2007 |
|---|---|---|
| CN | 102790860 A | 11/2012 |

(Continued)

OTHER PUBLICATIONS

Christina Kimmle et al., Compact dynamic microfluidic iris for active optics, Elsevier B.V. Microelectronic Engineering 88 (2011) 1772-1774 (Year: 2011).*

(Continued)

*Primary Examiner* — Christopher E Mahoney
(74) *Attorney, Agent, or Firm* — Houtteman Law LLC (57) ABSTRACT

A variable diaphragm is provided. The variable diaphragm includes: first and second substrates opposite to each other; a light detector on a side of the first substrate distal to the second substrate, and configured to detect an intensity of incident light and generate a first signal; an electrowetting microfluid medium layer between the first and second substrates, and including transparent and opaque fluid mediums immiscible with each other, wherein an aperture of the variable diaphragm is formed by the transparent fluid medium, and one of the transparent and opaque fluid mediums is conductive; and a driving electrode between the first and second substrates, and configured to receive a driving voltage corresponding to the first signal and for driving the electrowetting microfluid medium layer, so as to change an area of an orthographic projection of the opaque fluid medium fluid medium on the second substrate, thereby changing a diameter of the aperture.

20 Claims, 4 Drawing Sheets

(56) References Cited

U.S. PATENT DOCUMENTS

| | | | | |
|---|---|---|---|---|
| 2004/0145696 A1* | 7/2004 | Oue | .................. | G09G 3/344 |
| | | | | 349/167 |
| 2009/0103159 A1* | 4/2009 | Cheng | .................. | G02B 26/005 |
| | | | | 359/228 |
| 2013/0016515 A1* | 1/2013 | Chang | .................... | G03B 9/02 |
| | | | | 362/293 |
| 2014/0191107 A1* | 7/2014 | Lee | .................... | G01J 1/0437 |
| | | | | 250/201.1 |
| 2019/0361219 A1* | 11/2019 | Gao | .................... | G02B 26/005 |
| 2020/0158892 A1* | 5/2020 | Zhan | .................... | G01T 1/2023 |

FOREIGN PATENT DOCUMENTS

| | | | |
|---|---|---|---|
| CN | 102879899 | A | 1/2013 |
| CN | 103941391 | A | 7/2014 |
| CN | 104243782 | A | 12/2014 |
| CN | 105159045 | A | 12/2015 |
| CN | 204856002 | U | 12/2015 |
| CN | 107563361 | A | 1/2018 |
| CN | 107958191 | A | 4/2018 |
| CN | 109634002 | A | 4/2019 |
| CN | 110049255 | A | 7/2019 |
| KR | 20140146566 | A | 12/2014 |
| WO | 2013163878 | A1 | 11/2013 |

OTHER PUBLICATIONS

China Patent Office, First Office Action dated Aug. 26, 2020 for application No. CN201910318491.7.
China Patent Office, Second Office Action dated May 7, 2021 for application No. CN201910318491.7.

\* cited by examiner

VARIABLE DIAPHRAGM AND CONTROL METHOD THEREOF

CROSS REFERENCE TO RELATED APPLICATIONS

This is a National Phase Application filed under 35 U.S.C. 371 as a national stage pf PCT/CN2020/085228 filed on Apr. 17, 2020, an application claiming the priority of Chinese Patent Application No. 201910318491.7, filed on Apr. 19, 2019 in the Chinese Intellectual Property Office, the content of each of which is incorporated herein by reference in its entirety.

TECHNICAL FIELD

The present disclosure relates to an optical assembly, and more particularly, to a variable diaphragm. The present disclosure further relates to a control method for the variable diaphragm.

BACKGROUND

Illumination for photographing or a camera may be greatly different due to different lighting conditions for photographing as an environment changes. The change of the environment illumination may cause significant change of a contrast between a target image and a background. If overexposure or underexposure occurs, luminance nonuniformity, poor picture quality, low contrast and the like may occur in the image displayed on a screen, which may degrade the image quality. Therefore, in order to obtain an image or continuous pictures of clarity, high-contrast and proper exposure, especially to obtain substantially stable images in video recording, a corresponding automatic control method and a control circuit are desired to realize an automatic control for the light intensity entering a camera system.

SUMMARY

According to an aspect of the present disclosure, a variable diaphragm is provided. The variable diaphragm includes a first substrate and a second substrate opposite to each other; a light detector on a side of the first substrate distal to the second substrate, and configured to detect an intensity of incident light and generate a first signal; an electrowetting microfluid medium layer between the first substrate and the second substrate, and including a transparent fluid medium and an opaque fluid medium immiscible with the transparent fluid medium, wherein an aperture of the variable diaphragm is formed by the transparent fluid medium, and one of the transparent fluid medium and the opaque fluid medium is a conductive medium; and a driving electrode between the first substrate and the second substrate, and configured to receive a driving voltage corresponding to the first signal and for driving the electrowetting microfluid medium layer, so as to change an area in a direction parallel to the first substrate or the second substrate of a portion of one substrate covered by the opaque fluid medium, the one substrate being one of the first substrate and the second substrate that has a larger contact area with the opaque fluid medium, thereby changing a diameter of the aperture.

In some embodiments, the driving electrode includes a first electrode layer and a second electrode layer opposite to each other, the first electrode layer is on a side of the first substrate proximal to the electrowetting microfluid medium layer, the second electrode layer is on a side of the second substrate proximal to the electrowetting microfluid medium layer, and the electrowetting microfluid medium layer is between the first electrode layer and the second electrode layer.

In some embodiments, the first electrode layer includes a first block electrode covering a first surface of the electrowetting microfluid medium layer, the second electrode layer includes a second block electrode covering a second surface of the electrowetting microfluid medium layer, and the first block electrode and the second block electrode are right opposite to each other.

In some embodiments, the first electrode layer includes a plurality of first electrode lines extending along a first direction, the second electrode layer includes a plurality of second electrode lines extending along a second direction, and the first direction is perpendicular to the second direction.

In some embodiments, the first electrode layer includes a plurality of first annular electrodes concentrically arranged, the second electrode layer includes a plurality of second annular electrodes concentrically arranged, and the plurality of first annular electrodes are in one-to-one correspondence with the plurality of second annular electrodes.

In some embodiments, the variable diaphragm further includes a retaining wall between the first electrode layer and the second electrode layer and surrounding the electrowetting microfluid medium layer.

In some embodiments, a material of the retaining wall includes a material of a black matrix.

In some embodiments, the variable diaphragm further includes a resin coating layer coated on a surface of the light detector.

In some embodiments, the light detector includes a photoresistor.

In some embodiments, the transparent fluid medium is an insulating medium, and the opaque fluid medium is a conductive medium.

In some embodiments, the transparent fluid medium includes one or more of deionized water, purified water and distilled water, and the opaque fluid medium includes a conductive opaque component dissolved in a non-conductive organic solvent.

In some embodiments, the opaque component includes one or more of natural melanin, synthetic melanin, and oxidized melanin.

In some embodiments, the first substrate and the second substrate are transparent. In some embodiments, the driving electrode is transparent.

In some embodiments, the driving electrode includes indium tin oxide or metal.

According to another aspect of the present disclosure, a method for controlling the variable diaphragm is provided. The method includes obtaining the intensity of incident light and generating the first signal by a light detector; generating the driving voltage based on the first signal; and applying the driving voltage to the driving electrode, wherein under driving by the driving voltage, the area in the direction parallel to the first substrate or the second substrate of the portion of the one substrate covered by the opaque fluid medium is changed to change the diameter of the aperture, the one substrate being one of the first substrate and the second substrate that has a larger contact area with the opaque fluid medium.

In some embodiments, the area in the direction parallel to the first substrate or the second substrate of the portion of the one substrate, which is one of the first substrate and the second substrate that has a larger contact area with the opaque fluid medium, covered by the opaque fluid medium is changed, by changing a wetting angle of the transparent fluid medium or a wetting angle of the opaque fluid medium on the first substrate or the second substrate.

In some embodiments, the opaque fluid medium is a conductive medium, and the method includes: adjusting the driving voltage based on the intensity of the incident light when the intensity of the incident light is reduced, to increase the wetting angle of the opaque fluid medium on the one of the first substrate and the second substrate that has a larger contact area with the opaque fluid medium, and to increase the diameter of the aperture; or, adjusting the driving voltage based on the intensity of the incident light when the intensity of the incident light is increased, to reduce the wetting angle of the opaque fluid medium on the one of the first substrate and the second substrate that has a larger contact area with the opaque fluid medium, and to reduce the diameter of the aperture.

DETAILED DESCRIPTION

In order to make the objects, technical solutions and advantages of the embodiments of the present disclosure more apparent, the technical solutions of the embodiments of the present disclosure will be described clearly and completely below with reference to the drawings for the embodiments of the present disclosure. It is to be understood that the described embodiments are merely some embodiments of the present disclosure, and not all embodiments thereof. All other embodiments that can be derived by one of ordinary skill in the art from the described embodiments of the present disclosure without inventive effort are within the scope of the present disclosure.

Unless otherwise defined, technical or scientific terms used herein shall have the ordinary meaning as understood by one of ordinary skill in the art to which the present disclosure belongs. The words of "comprise", "include", or the like used in the present disclosure, means that the element or item preceding the word contains the element or item listed after the word and its equivalents, but does not exclude the presence of other elements or items. The terms "connect", "couple" and the like are not limited to physical or mechanical connections, but may include electrical connections and the like, whether direct or indirect connections. The terms such as "upper", "lower", "left", "right", and the like are used merely for indicating relative positional relationships, and when an absolute position of the object described is changed, the relative positional relationships may also be changed accordingly.

For clarity and conciseness of the following description of the embodiments of the present disclosure, a detailed description of known functions and known components is omitted from the present disclosure.

The inventor of the present disclosure has found out that automatic light intensity control is a common image pre-processing technique, which is simple in principle but difficult to be implemented. Especially during a real-time photographing, it has become particularly difficult to obtain continuous, clear and distinguishable pictures due to movement of a target and change of light intensity. If the light intensity is not controlled accurately, it may inevitably cause the light intensity control to be non-automatic and not continuous. Therefore, it is one of the difficulties of automatic light intensity control to distinguish weak variation of the light intensity entering a camera system and to implement seamless control on the weak variation. Therefore, according to an aspect of the present disclosure, a variable diaphragm (which may also be referred to as iris diaphragm) is provided, which can dynamically control the light intensity. The variable diaphragm can precisely control the throughput of light in real time.

Figure 1:
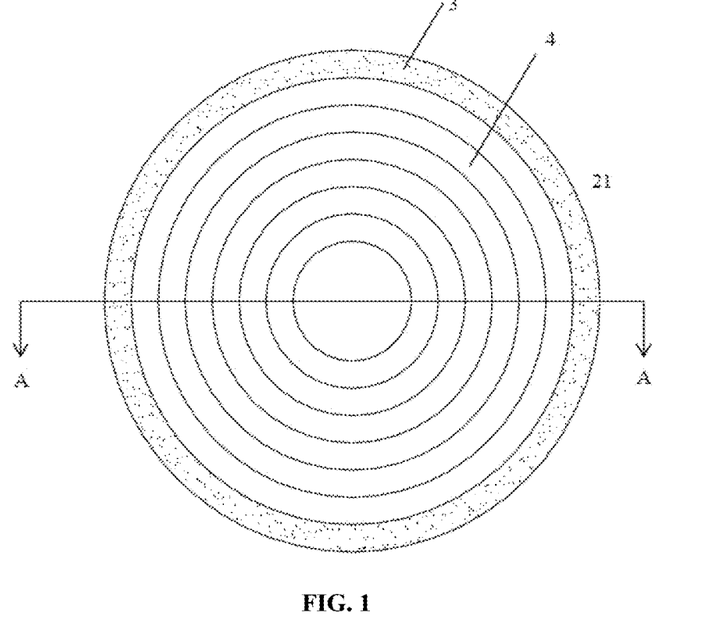
FIG. 1 is a schematic diagram showing a structure of a variable diaphragm in dark ambient light according to an embodiment of the present disclosure.
Figure 3:
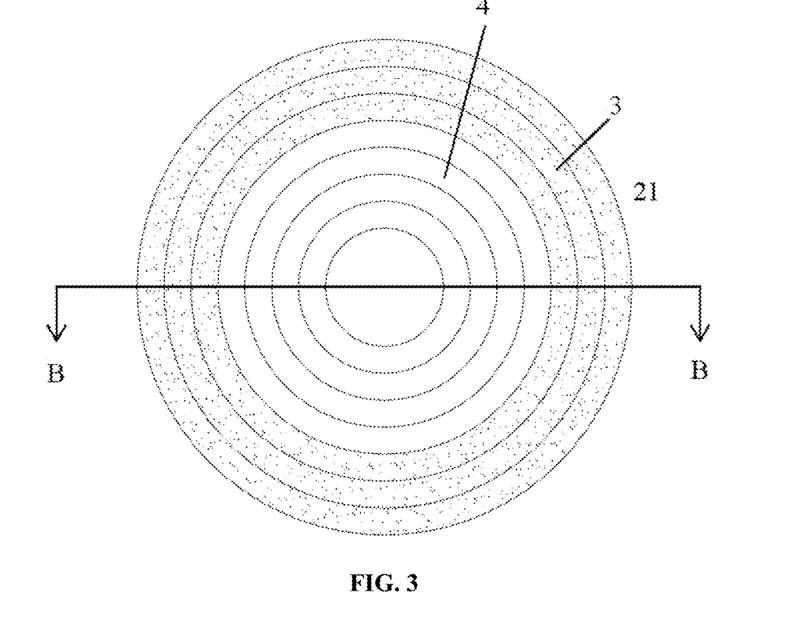
FIG. 3 is a schematic diagram showing a structure of a variable diaphragm in bright ambient light according to an embodiment of the present disclosure.
Figure 5:
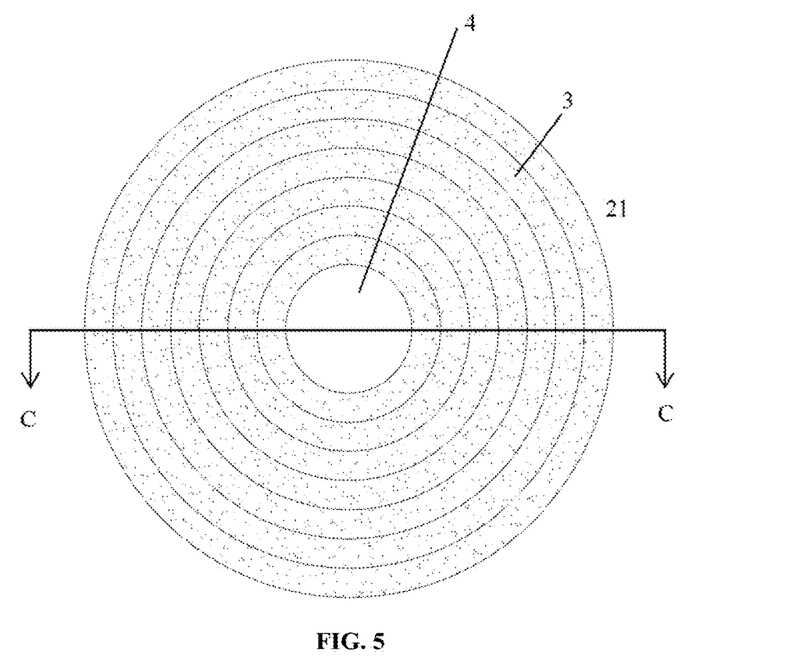
FIG. 5 is a schematic diagram showing a structure of a variable diaphragm in brighter ambient light according to an embodiment of the present disclosure.

Referring to FIGS. 1, 3 and 5, in the technical solution of the present disclosure, a diameter of an aperture (or opening or hole) of the variable diaphragm may be dynamically adjusted according to an intensity of the ambient light. For example, as shown in FIG. 1, in a case of dark ambient light, external light intensity information is obtained by a light detector, a corresponding voltage signal is generated based on the light intensity information obtained by the light detector, and the corresponding voltage signal is applied to a driving electrode, such that a voltage across two sides of an electrowetting microfluid medium layer may be changed, thereby adjusting the diameter of the variable diaphragm. In the circular diaphragm shown in FIGS. 1, 3, and 5, an opaque fluid medium shown as a shaded portion is near the outer edge of the circular diaphragm, a transparent fluid medium is in the center region of the circular diaphragm. The opaque fluid medium surrounds the transparent fluid medium, and the aperture of the circular diaphragm is formed by the transparent fluid medium. The portion of the aperture of the circular diaphragm may include only the transparent fluid medium. A shape of the variable diaphragm is not limited to a circle and may be other shapes as desired. In FIGS. 1, 3 and 5, regions with the opaque fluid medium are represented as filled regions, regions with the transparent fluid medium are represented as unfilled regions, each annular structure represents an exemplary annular electrode, and a diameter of the annular electrode is related to the diameter of the aperture of the variable diaphragm.

Figure 2:
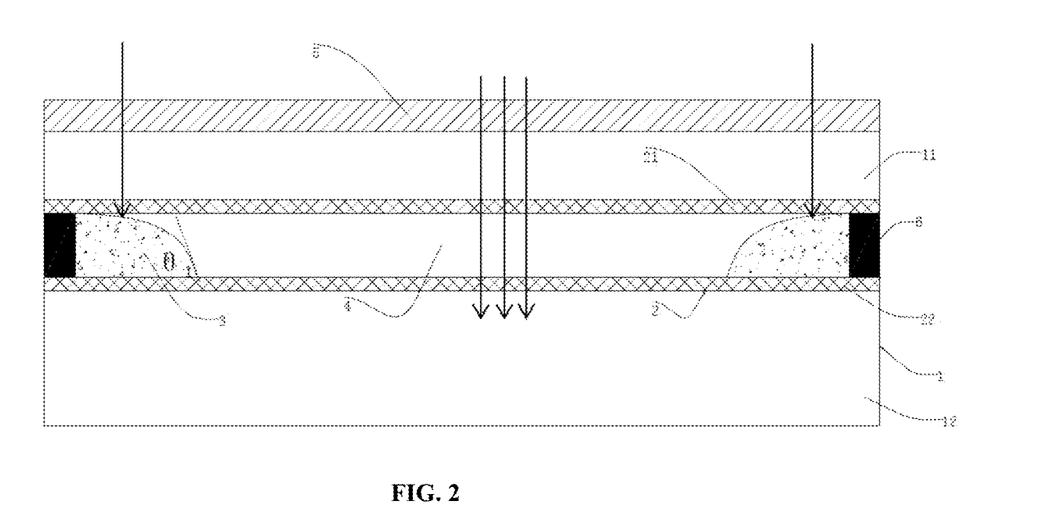
FIG. 2 is a schematic cross-sectional view of the variable diaphragm taken along line A-A of FIG. 1.
Figure 4:
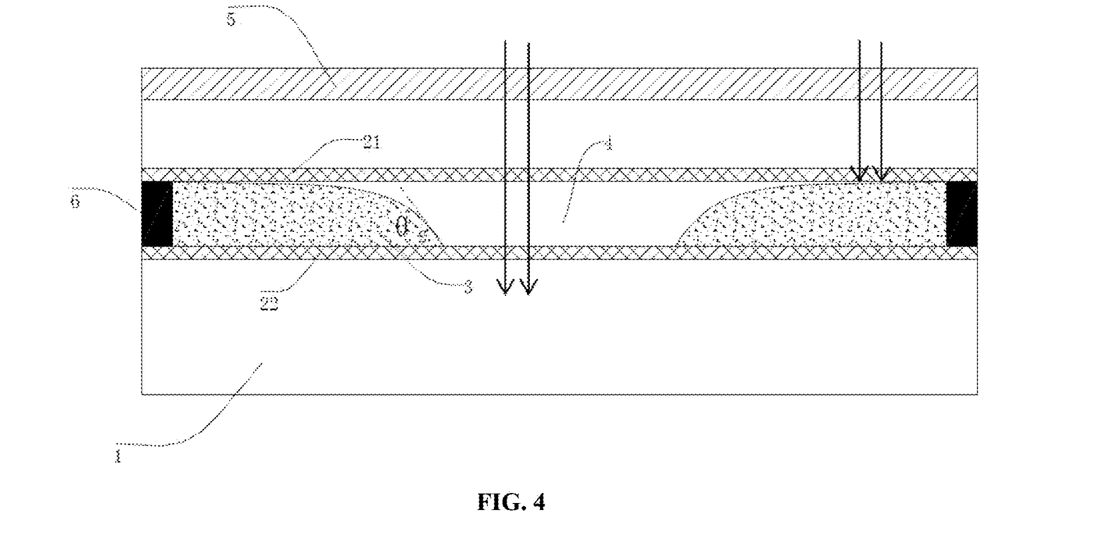
FIG. 4 is a schematic cross-sectional view of the variable diaphragm taken along line B-B of FIG. 3.
Figure 6:
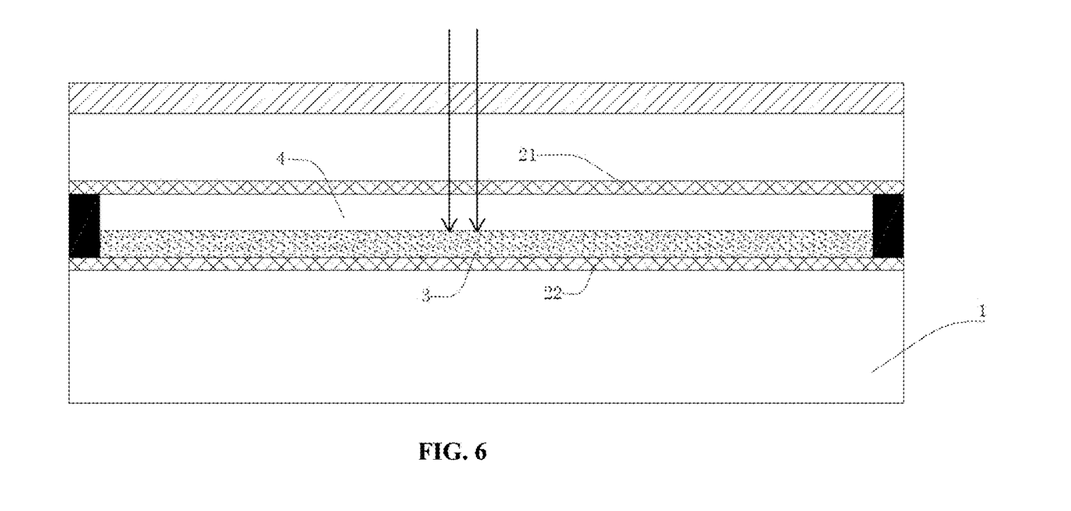
FIG. 6 is a schematic cross-sectional view of the variable diaphragm taken along line C-C of FIG. 5.

Referring to FIGS. 2, 4 and 6 of the present disclosure, the variable diaphragm of the present disclosure may include a substrate 1, a light detector 5, an electrowetting microfluid medium layer, and a driving electrode 2. The substrate 1 is made of a transparent material, and at least includes a first substrate 11 and a second substrate 12 opposite to each other. The light detector 5 is on a side of the first substrate 11 distal to the second substrate 12, for detecting an intensity of incident light and generating a first signal. The electrowetting microfluid medium layer is between the first substrate 11 and the second substrate 12, and includes a transparent fluid medium 4 and an opaque fluid medium 3 immiscible with the transparent fluid medium 4. The aperture of the variable diaphragm is formed by the transparent fluid medium 4. One of the transparent fluid medium 4 and the opaque fluid medium 3 is a conductive medium. The driving electrode 2 is between the first substrate 11 and the second substrate 12 and may receive a driving voltage corresponding to the first signal and for driving the electrowetting microfluid medium layer, so as to change an area in a direction parallel to the first substrate 11 or the second substrate 12 of a portion of one substrate covered by the opaque fluid medium 3, and the one substrate is one of the first substrate 11 and the second substrate 12 that has a larger contact area with the opaque fluid medium 3, thereby changing the diameter of the aperture of the variable diaphragm. The respective components of the variable diaphragm will be further described below.

The variable diaphragm of the present disclosure may be applied to the fields that require high precision on the light intensity and dynamic change of the light intensity, such as photography, video recording, medical imaging systems, aerospace photography, etc. Therefore, a transparent material should be selected to manufacture the substrate 1, for example, a glass substrate for a liquid crystal display (LCD) or an organic light emitting diode (OLED) display may be adopted as the substrate 1, and of course, materials such as optical glass, resin, etc. with special properties may also be used to manufacture the substrate 1. One of ordinary skill in the art may also make necessary adjustments to specification of the substrate, such as thickness, based on an actual application scenario, and the present disclosure is not limited thereto. Generally, a thickness of the substrate may be in a range from 0.1 mm to 2 mm. It should be noted that although parameters such as the thickness are determined by specific product design or process conditions, it is desirable that the top and bottom surfaces of the substrate have good flatness and parallelism.

In the variable diaphragm of the present disclosure, as shown in FIGS. 2, 4 and 6, the light detector 5 may be on a side where the ambient light enters the variable diaphragm. The light detector 5 shown in the figures is on a side of the first substrate 11 distal to the second substrate 12 for detecting the intensity of the incident light (e.g., as indicated by the vertical downward arrows in FIGS. 2, 4 and 6) and generating the first signal. The first signal is used for dynamically generating an electric signal based on the dynamic change of the light intensity in the environment. The electrical signal will subsequently serve as a condition for triggering a change of the diameter of the aperture of the variable diaphragm, and the electrical signal may be in particular a current value or a resistance value. For example, in some embodiments, the light detector 5 may be a photoresistor made of semiconductor material, such as cadmium sulfide and cadmium selenide. The photoresistor may be a photoresistor a resistance of which is reduced as the intensity of the incident light is increased, or a photoresistor a resistance of which is increased as the intensity of the incident light is increased. When the light intensity in the environment changes, the resistance value of the photoresistor changes, and thus the resistance value may be used as the first signal, and a current value or a voltage value in a circuit loop where the photoresistor is located may alternatively be used as the first signal. In addition, in order to reduce the influence of the extreme environment on the accuracy and lifespan of the light detector 5, a resin coating may be provided on the surface of the light detector 5 (e.g., on the upper surface, the left side surface, and the right side surface of the light detector 5 in each of FIGS. 2, 4, and 6) for moisture resistance. The selection of the resin for moisture resistance is not particularly limited in the present disclosure, and one of ordinary skill in the art may select appropriate materials within a suitable range. Optionally, an epoxy resin, an epoxy-modified resin, an acrylic resin, a photosensitive resin, or the like may be selected for moisture resistance.

Referring again to FIGS. 2, 4 and 6, the electrowetting microfluid medium layer may include the transparent fluid medium 4 and the opaque fluid medium 3. The transparent fluid medium 4 and the opaque fluid medium 3 are immiscible to each other, and the transparent fluid medium 4 or the opaque fluid medium 3 may be changed into conductive medium by adding conductive particles therein. In the embodiments shown in FIGS. 2, 4 and 6, the opaque fluid medium 3 is formed to be an electrically conductive medium by adding electrically conductive and opaque components into a non-conductive organic solvent. The electrically conductive and opaque components may include one or more of natural melanin, synthetic melanin and oxidized melanin, for example. In this case, the transparent fluid medium 4 is correspondingly an insulating medium, and a wetting angle $\theta 1$ (as shown in FIG. 2) or $\theta 2$ (as shown in FIG. 4) of the opaque fluid medium 3 on the second substrate 12 is formed. The diameter of the aperture (i.e., a transparent hole) of the variable diaphragm may be adjusted by controlling the wetting angle of the opaque fluid medium 3 on the second substrate 12. It should be appreciated that alternatively, the diameter of the aperture of the variable diaphragm may be adjusted by controlling a wetting angle of the transparent fluid medium 4 on the first substrate 11. For convenience of description, the wetting angle of the opaque fluid medium 3 on the second substrate 12 is illustrated in FIGS. 2 and 4 as an example.

The above describes a part of the configuration of the variable diaphragm provided by the present disclosure. In addition, taking FIG. 2 as an example, the driving electrode 2 may be made of a transparent conductive material, such as Indium Tin Oxide (ITO), but is not limited thereto. The driving electrode 2 may have a total thickness (e.g., a size in a direction perpendicular to the first substrate 11 or the second substrate 12) in a range from 50 nm to 1000 nm. The driving electrode 2 may alternatively be made of metal, such as Mo, with a total thickness that may meet the requirements of the applied voltage based on the specific product design requirements, such as in a range from 70 nm to 300 nm.

The driving electrode 2 may receive a driving voltage for driving the electrowetting microfluid medium layer and corresponding to the first signal, so as to change the wetting angle of the opaque fluid medium 3 or the transparent fluid medium 4, e.g., so as to change the wetting angle $\theta 1$ of the opaque fluid medium 3 in the example of FIG. 2. Specifically, as shown in FIG. 2, the driving electrode 2 includes a first electrode layer 21 and a second electrode layer 22 opposite to each other. The first electrode layer 21 is on a side of the first substrate 11 proximal to the electrowetting microfluid medium layer, and the second electrode layer 22 is on a side of the second substrate 12 proximal to the electrowetting microfluid medium layer. The electrowetting microfluid medium layer is between the first electrode layer 21 and the second electrode layer 22. In the present embodiment, the conductive particles are provided in the opaque fluid medium 3 as an example. Alternatively, it will be appreciated by one of ordinary skill in the art that the diameter the aperture of the variable diaphragm may be dynamically adjusted in response to changes of the light intensity by adding transparent conductive particles to the transparent fluid medium 4 and by controlling the wetting angle of the transparent fluid medium 4 on the first substrate 11 by the driving electrode 2.

FIGS. 1, 3 and 5 show top views of the variable diaphragm of the present disclosure under different light conditions. As shown in the FIGS. 1, 3 and 5, in general, the opaque fluid medium 3 is in a peripheral region of the transparent fluid medium 4, and the transparent fluid medium 4 in the center region constitutes an aperture (i.e., a transparent hole or a transparent opening) for allowing light to penetrate there through. When the aperture is completely closed, the transparent fluid medium 4 is actually stacked with the opaque fluid medium 3 (i.e. the opaque fluid medium 3 completely covers the transparent fluid medium 4), which means that the light is now too bright and the light intensity needs to be controlled by the opaque fluid medium 3. Furthermore, it can be seen that, for the sake of ease illustration, in the top views shown in FIGS. 1, 3 and 5, the first electrode layer 21 is shown after removal of the first substrate 11, and the distribution of the opaque fluid medium 3 incompletely covering the transparent fluid medium 4 is shown. The first electrode layer 21 includes a plurality of first annular electrodes concentrically arranged. Similarly, the second electrode layer 22 may also include a plurality of second annular electrodes concentrically arranged. The plurality of first annular electrodes are arranged in one-to-one correspondence with the plurality of second annular electrodes (e.g., the plurality of first annular electrodes may overlap (e.g., completely overlap) with the plurality of second annular electrodes in a direction perpendicular to the first substrate 11 or the second substrate 12, respectively). Each of the plurality of first annular electrodes or each of the plurality of second annular electrodes may independently receive a driving voltage corresponding to the first signal and for driving the electrowetting microfluid medium layer, so as to change the wetting angle. For example, FIG. 2 shows a situation where the ambient light is dark. As shown in the FIG. 2, when the ambient light detected by the light detector 5 is dark, the wetting angle of the opaque fluid medium 3 on the second substrate 12 is $\theta_1$, and the voltage value across each first annular electrode and the corresponding second annular electrode is $V_1$. It can be seen that a larger aperture of the variable diaphragm is formed because the opaque fluid medium 3 recedes to both sides of the first substrate 11 and the second substrate 12, and the transparent fluid medium 4 is spread on the second substrate 12 along the diameter of the aperture of the variable diaphragm, such that more light can penetrate through the variable diaphragm smoothly, and a state similar to a gray level L255 in display is achieved. The subsequent FIG. 4 shows the ambient light is brighter than that shown in FIG. 2. As shown in FIG. 4, the wetting angle of the opaque fluid medium 3 on the second substrate 12 is $\theta_2$, and the voltage value across each first annular electrode and the corresponding second annular electrode is $V_2$. It can be seen that, in this case, the opaque fluid medium 3 moves (or wets or immerses) towards the center region under the voltage V2 across the first annular electrodes and the second annular electrodes, while the transparent fluid medium 4 at the center region is gradually retracted and the diameter of the aperture of the variable diaphragm becomes smaller. In this case, the wetting angle of the opaque fluid medium 3 on the second substrate 12 is $\theta_2$, and is significantly smaller than that when the ambient light is dark, that is, $\theta_1 > \theta_2$. The voltage across both sides of the electrowetting microfluid medium layer is $V_2$, and $V_2 > V_1$. It can be seen that, the opaque fluid medium 3 immerses towards the center region to form a smaller aperture than that in the case of darker ambient light (i.e., the case as shown in FIGS. 1 and 2), which means that a smaller amount of light penetrates through the aperture than that in the case of FIG. 2, achieving states similar to different gray levels in display. FIG. 6 shows a situation that the ambient light is brighter than that shown in FIGS. 3 and 4. As shown in FIG. 6, when the ambient light detected by the light detector 5 is brighter, the wetting angle of the opaque fluid medium 3 on the second substrate 12 is $\theta_3$ (not shown), and the voltage value across each first annular electrode and the corresponding second annular electrode is $V_3$. It can be seen that, the opaque fluid medium 3 immerses towards the center region and completely covers the aperture, while the transparent fluid medium 4 is "forced" to retract above the opaque fluid medium 3 due to being immiscible with the opaque fluid medium 3 and the aperture has been completely closed. In this case, light, although able to penetrate through the transparent fluid medium 4, is still blocked by the opaque fluid medium 3 below the transparent fluid medium 4, and no light is able to penetrate through the aperture of the variable diaphragm, achieving a state similar to gray level L0 (e.g. a completely black state) in display. It can be concluded that, in a case where the opaque fluid medium 3 is used as a main electrowetting fluid, when the intensity of the ambient light is changed from weak to strong, the wetting angle of the opaque fluid medium 3 on the second substrate 12 is changed from large to small, i.e., $\theta_1 > \theta_2 > \theta_3$, and the voltage applied across both sides of the electrowetting microfluid medium layer is changed from small to large, i.e., $V_1 < V_2 < V_3$. It can also be concluded that the opaque fluid medium 3 has been evenly distributed on the second substrate 12 at a wetting angle of 0° (i.e., $\theta_3 = 0°$), the aperture has been completely closed and no light can penetrate through the variable diaphragm. The opaque fluid medium 3 retracts from the center region to the edge at a wetting angle greater than or equal to 90°, and the aperture of the variable diaphragm is dynamically adjusted to a relatively large diameter. This means that in the present disclosure, the diameter of the aperture of the variable diaphragm may be determined according to the wetting angle, and the wetting angle is in a range from 0° to 180°.

As described above, it is conceivable that the relationship between the change of the wetting angle or the voltage and the change of the ambient light described above also applicable to the case where the wetting angle is changed by applying a voltage to control the transparent fluid medium 4 so as to change the diameter of the aperture of the variable diaphragm.

In some embodiments, as shown in FIG. 2, optionally, the first electrode layer 21 includes a first block electrode covering a first surface of the electrowetting microfluid medium layer, and the second electrode layer 22 includes a second block electrode covering a second surface of the electrowetting microfluid medium layer. The first block electrode and the second block electrode may be right opposite to each other (i.e., may completely overlap with each other in a direction perpendicular to the first substrate 11 or the second substrate 12). Since the first and second block electrodes cover the electrowetting microfluid medium layer and are in a block shape, the first electrode layer 21 shown in FIG. 2 may represent the first block electrode and the second electrode layer 22 may represent the second block electrode. The first surface may be an upper surface of the electrowetting microfluid medium layer and the second surface may be a lower surface of the electrowetting microfluid medium layer. The upper surface and the lower surface are opposite to each other. By applying a driving voltage across the first block electrode and the second block electrode, an area in a direction parallel to the first substrate 11 or the second substrate 12 of a portion of one substrate (i.e., the second substrate 12 as shown in FIGS. 2, 4 and 6) covered by the opaque fluid medium 3 may be changed, and the one substrate is one of the first substrate 11 and the second substrate 12 that has a larger contact area with the opaque fluid medium 3.

In some embodiments, as shown in FIGS. 2, 4 and 6, optionally, the variable diaphragm further includes a retaining wall 6. The retaining wall 6 is between the first electrode layer 21 and the second electrode layer 22, and surrounds the electrowetting microfluid medium layer, i.e., the retaining wall 6 is arranged corresponding to the peripheral region of each of the first block electrode and the second block electrode. A thickness of the region where the electrowetting microfluid medium layer is located may be controlled by a thickness (i.e., a size in the direction perpendicular to the first substrate 11 or the second substrate 12) of the retaining wall 6, so as to package the various components of the variable diaphragm together. In addition, the retaining wall 6 may prevent the influence of ambient light and stray light on the variable diaphragm. The thickness and a width (i.e., a size in the direction parallel to the first substrate 11 or the second substrate 12) of the retaining wall 6 may be set according to requirements of actual applications, and are not particularly limited herein. Specifically, the retaining wall 6 may actually be a black matrix BM, or a combination of the BM and a photo spacer PS.

Figure 7:
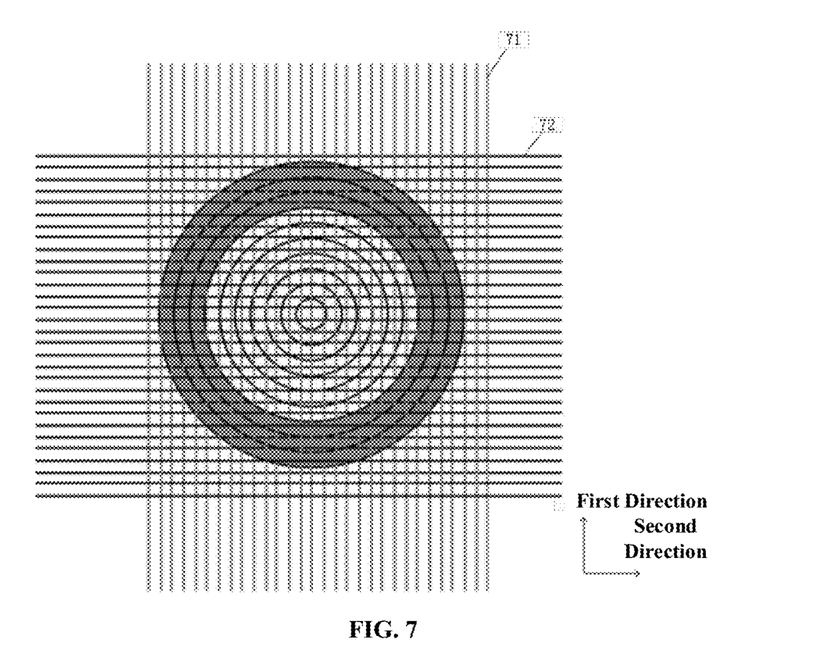
FIG. 7 is a schematic diagram showing a driving electrode of a variable diaphragm according to an embodiment of the present disclosure.

In some embodiments, as shown in FIG. 7, optionally, the first electrode layer 21 includes a plurality of first electrode lines 71 extending along a first direction, and the second electrode layer 22 includes a plurality of second electrode lines 72 extending along a second direction. The first direction may be perpendicular to the second direction. Optionally, the plurality of first electrode lines 71 and the plurality of second electrode lines 72 are perpendicular to each other and cross each other to form a grid. Each of the plurality of first electrode lines 71 and the plurality of second electrode lines 72 may exemplarily be a silver nanowire in the present disclosure. In the present embodiment, a control of the wetting angle of the electrowetting fluid (i.e., the opaque fluid medium 3 or the transparent fluid medium 4) in different regions may be achieved by driving the first and second electrode lines in a manner similar to a manner of driving source lines and gate lines, which cross to each other, in a liquid crystal display to achieve a display function. When the source lines and the gate lines are arranged more densely, the driving electrodes formed by the source lines and the gate lines are more similar to annular electrodes. It should be understood that, in the embodiment shown in FIG. 7, the plurality of first electrode lines 71 form the first electrode layer 21, and the plurality of second electrode lines 72 form the second electrode layer 22. That is, the first electrode layer 21 or the second electrode layer 22 may not include any annular electrode or any electrode block. An equivalent annular electric field may be formed by applying a voltage difference across some of the plurality of first electrode lines 71 and corresponding ones of the plurality of second electrode lines 72.

In addition, in the technical solution of the present disclosure, basic components of the electrowetting micro fluid may include an opaque melanin solution (which is generally an organic solvent such as methanol, propylene glycol, ethylene glycol, etc.) and water (e.g., deionized water, pure water, or distilled water). Specifically, the transparent fluid medium is an insulating medium layer and is one or more selected from deionized water, pure water and distilled water. The opaque fluid medium is a conductive medium and is formed by mixing conductive particles formed by a black opaque component with a non-conductive organic solvent. The black opaque component may account for 0.5 wt % to 5 wt % in percentage by mass. The black opaque component in the present disclosure is typically one or more selected from natural melanin, synthetic melanin, and oxidized melanin. As for the selection of natural melanin, synthetic melanin or oxidized melanin, the present disclosure is not limited in particular. Materials that can be dissolved in an organic solvent and can make the solution exhibit black, opaque and conductive properties, such as E-ink, carbon black, a black metal oxide, and the like, may be adopted to implement the technical solution of the present disclosure.

Figure 8:
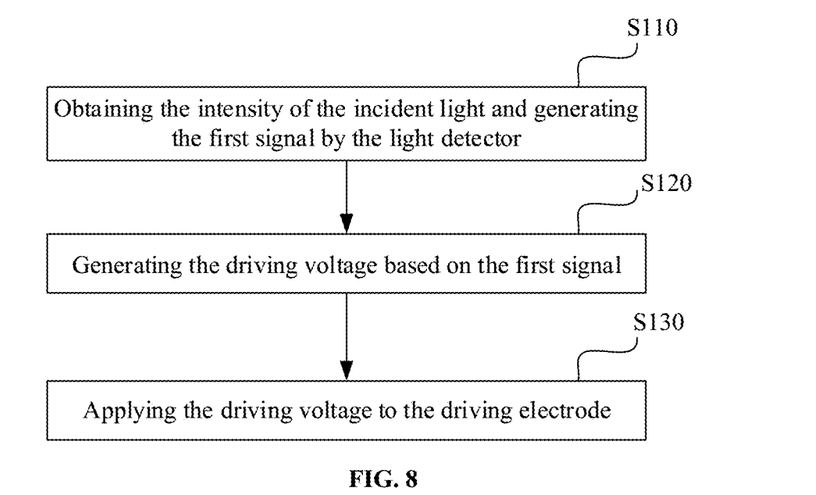
FIG. 8 is a schematic flowchart of a control method for a variable diaphragm according to an embodiment of the present disclosure.

FIG. 8 is a flowchart of a control method for a variable diaphragm according to an embodiment of the present disclosure. As shown in FIG. 8, the method includes the following steps.

In step S110, the intensity of the incident light is obtained by the light detector and a first signal is generated by the light detector. The first signal may be a resistance value of the light detector or a voltage or current value related to the intensity of the incident light. In step S120, a driving voltage is generated based on the first signal. In step S130, the driving voltage corresponding to the first signal is applied to the driving electrode. An overlapping area of the opaque fluid medium and the transparent fluid medium, which are immiscible with each other, in a direction parallel to the substrate is changed under the driving by the driving voltage, so as to change a diameter of an aperture of the variable diaphragm. In a specific implementation, an area in a direction parallel to the substrate a portion of one substrate (which is the second substrate 12 in the embodiments of FIGS. 2, 4 and 6) covered by the opaque fluid medium 3 is changed by changing the wetting angle of the opaque fluid medium or the transparent fluid medium, and the one substrate is one of the first substrate 11 and the second substrate 12 that has a larger contact area with the opaque fluid medium 3.

When the control method provided by the present disclosure is implemented, specifically, in a case where the opaque fluid medium is a conductive medium, the area in the direction parallel to the first substrate or the second substrate of a portion of the second substrate 12 covered by the opaque fluid medium is changed under the driving by the driving voltage. For example, when the intensity of the incident light is reduced, the driving voltage is adjusted (e.g., reduced) based on the intensity of the incident light, such that the wetting angle of the opaque fluid medium on the substrate is increased, and the diameter of the aperture of the variable diaphragm formed in the substrate is increased. When the intensity of the incident light is increased, the driving voltage is adjusted (e.g., increased) based on the intensity of the incident light, such that the wetting angle of the opaque fluid medium on the substrate is reduced, and the diameter of the aperture of the variable diaphragm formed in the substrate is reduced. In this way, a dynamic control of the light intensity may be achieved by the variable diaphragm through adjusting the wetting angle of the opaque fluid medium on the substrate.

The above embodiments are only exemplary embodiments of the present disclosure, and are not intended to limit the present disclosure. The scope of the present disclosure is defined by the appended claims. Various modifications and equivalent replacements of the present disclosure may be made by one of ordinary skill in the art within the scope of the present disclosure as defined by the appended claims, and such modifications and equivalent replacements are also considered to fall within the scope of the present disclosure.

What is claimed is:

1. A variable diaphragm, comprising:
a first substrate and a second substrate opposite to each other;
a light detector on a side of the first substrate distal to the second substrate, and configured to detect an intensity of incident light and generate a first signal;
an electrowetting microfluid medium layer between the first substrate and the second substrate, and comprising a transparent fluid medium and an opaque fluid medium immiscible with the transparent fluid medium, wherein an aperture of the variable diaphragm is formed by the transparent fluid medium, and one of the transparent fluid medium and the opaque fluid medium is a conductive medium; and
a driving electrode between the first substrate and the second substrate, and configured to receive a driving voltage corresponding to the first signal and for driving the electrowetting microfluid medium layer, so as to change an area in a direction parallel to the first substrate or the second substrate of a portion of one substrate covered by the opaque fluid medium, the one substrate being one of the first substrate and the second substrate that has a larger contact area with the opaque fluid medium, thereby changing a diameter of the aperture;
wherein the opaque fluid medium is a conductive medium,
the opaque fluid medium comprises a conductive opaque component dissolved in a non-conductive organic solvent, and
the opaque component accounts for 0.5 wt % to 5 wt % in percentage by mass.

2. The variable diaphragm of claim 1, wherein the driving electrode comprises a first electrode layer and a second electrode layer opposite to each other, the first electrode layer is on a side of the first substrate proximal to the electrowetting microfluid medium layer, the second electrode layer is on a side of the second substrate proximal to the electrowetting microfluid medium layer, and the electrowetting microfluid medium layer is between the first electrode layer and the second electrode layer.

3. The variable diaphragm of claim 2, wherein the first electrode layer comprises a first block electrode covering a first surface of the electrowetting microfluid medium layer, the second electrode layer comprises a second block electrode covering a second surface of the electrowetting microfluid medium layer, and the first block electrode and the second block electrode completely overlap with each other in a direction perpendicular to the first substrate or the second substrate.

4. The variable diaphragm of claim 3, further comprising a retaining wall between the first electrode layer and the second electrode layer and surrounding the electrowetting microfluid medium layer.

5. The variable diaphragm of claim 4, wherein a material of the retaining wall comprises a material of a black matrix.

6. The variable diaphragm of claim 2, wherein the first electrode layer comprises a plurality of first electrode lines extending along a first direction, the second electrode layer comprises a plurality of second electrode lines extending along a second direction, and the first direction is perpendicular to the second direction.

7. The variable diaphragm of claim 6, further comprising a retaining wall between the first electrode layer and the second electrode layer and surrounding the electrowetting microfluid medium layer.

8. The variable diaphragm of claim 2, wherein the first electrode layer comprises a plurality of first annular electrodes concentrically arranged, the second electrode layer comprises a plurality of second annular electrodes concentrically arranged, and the plurality of first annular electrodes are in one-to-one correspondence with the plurality of second annular electrodes.

9. The variable diaphragm of claim 8, further comprising a retaining wall between the first electrode layer and the second electrode layer and surrounding the electrowetting microfluid medium layer.

10. The variable diaphragm of claim 1, further comprising a resin coating layer coated on a surface of the light detector.

11. The variable diaphragm of claim 10, wherein the light detector comprises a photoresistor.

12. The variable diaphragm of claim 1, wherein the transparent fluid medium is an insulating medium.

13. The variable diaphragm of claim 12, wherein the transparent fluid medium comprises one or more of deionized water, purified water and distilled water.

14. The variable diaphragm of claim 1, wherein the opaque component comprises one or more of natural melanin, synthetic melanin, and oxidized melanin.

15. The variable diaphragm of claim 1, wherein the first substrate and the second substrate are transparent.

16. The variable diaphragm of claim 1, wherein the driving electrode is transparent.

17. The variable diaphragm of claim 16, wherein the driving electrode comprises indium tin oxide or metal.

18. A method for controlling a variable diaphragm, the variable diaphragm being the variable diaphragm of claim 1, the method comprising:
obtaining the intensity of the incident light and generating the first signal by the light detector;
generating the driving voltage based on the first signal; and
applying the driving voltage to the driving electrode,
wherein under driving by the driving voltage, the area in the direction parallel to the first substrate or the second substrate of the portion of the one substrate covered by the opaque fluid medium is changed to change the diameter of the aperture, the one substrate being one of the first substrate and the second substrate that has a larger contact area with the opaque fluid medium.

19. The method of claim 18, wherein the area in the direction parallel to the first substrate or the second substrate of the portion of the one substrate, which is one of the first substrate and the second substrate that has a larger contact area with the opaque fluid medium, covered by the opaque fluid medium is changed, by changing a wetting angle of the transparent fluid medium or a wetting angle of the opaque fluid medium on the first substrate or the second substrate.

20. The method of claim 19, wherein the opaque fluid medium is a conductive medium, and the method comprises:
adjusting the driving voltage based on the intensity of the incident light when the intensity of the incident light is reduced, to increase the wetting angle of the opaque fluid medium on the one of the first substrate and the second substrate that has a larger contact area with the opaque fluid medium, and to increase the diameter of the aperture; or adjusting the driving voltage based on the intensity of the incident light when the intensity of the incident light is increased, to reduce the wetting angle of the opaque fluid medium on the one of the first substrate and the second substrate that has a larger contact area with the opaque fluid medium, and to reduce the diameter of the aperture.

* * * * *